Sept. 2, 1958 R. A. PALMER 2,849,946
TOASTER APPARATUS
Filed Feb. 5, 1957 2 Sheets-Sheet 1
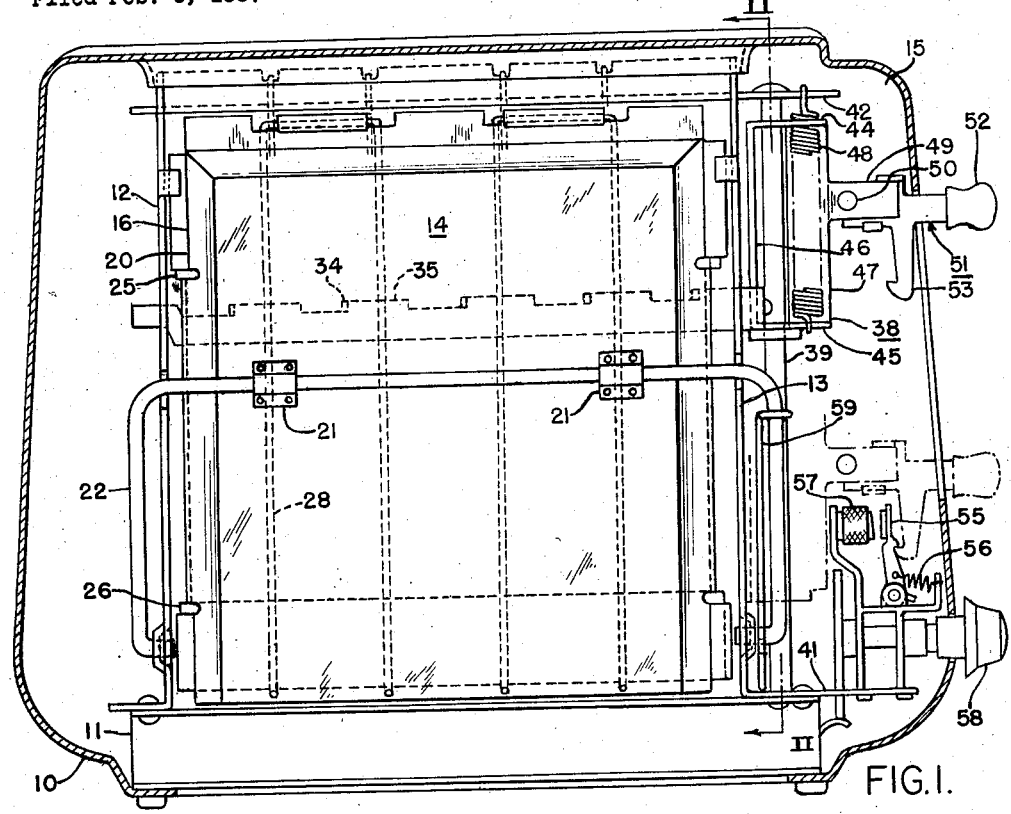
FIG. I.
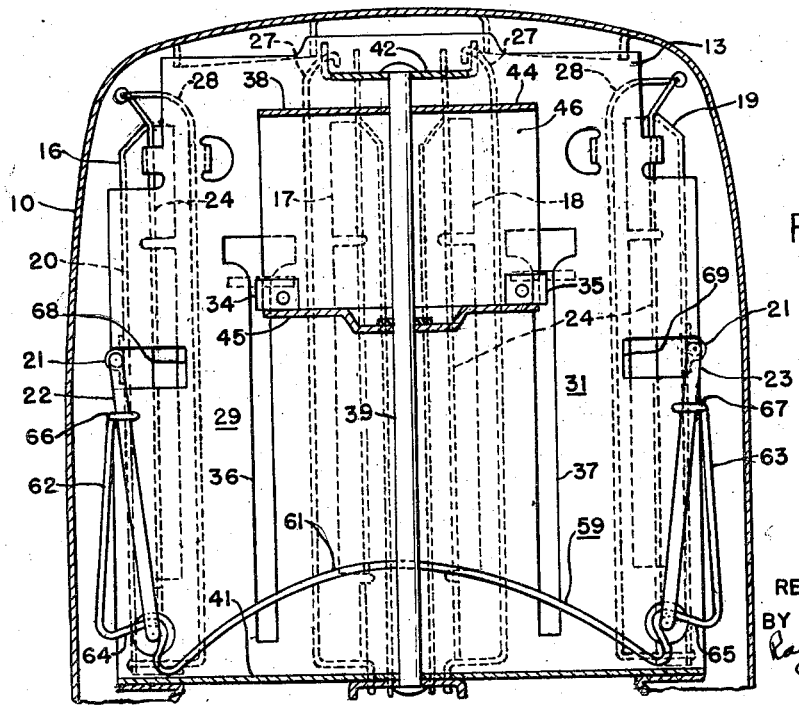
FIG. 2.
INVENTOR
REED A. PALMER
BY
ATTORNEY Sept. 2, 1958 R. A. PALMER 2,849,946
TOASTER APPARATUS
Filed Feb. 5, 1957 2 Sheets-Sheet 2

INVENTOR
REED A. PALMER
BY
ATTORNEY

United States Patent Office 2,849,946
Patented Sept. 2, 1958

2,849,946
TOASTER APPARATUS

Reed A. Palmer, Mansfield, Ohio, assignor to Westinghouse Electric Corporation, East Pittsburgh, Pa., a corporation of Pennsylvania Application February 5, 1957, Serial No. 638,254

6 Claims. (Cl. 99—390)

This invention relates to toasting apparatus of the so-called "pop-up" type and has for an object to provide improved apparatus of this kind.

Domestic toasters of the so-called "pop-up" type include a toasting well within a casing in which a slice carrier is arranged for vertical movement between an upper, slice receiving position and a lower, toasting position. A handle is usually provided exteriorly of the casing for depressing the carrier to its toasting position after the slice to be toasted is deposited on the carrier through an access opening in the top of the casing. If a bread slice is unevenly sliced, or is unusually thick or thin, and it is inserted between the two fixed, parallel, heaters of an ordinary toaster, the bread surfaces are disposed at varying distances from the heat source, and uneven toasting will result. In accordance with this invention, unique means, actuated when the bread is in toasting position, is provided in order to properly position the heaters with respect to a bread slice when it is toasted. After the toasting operation, the heaters move apart as the slice carrier is elevated to its upper position wherein the toasted bread slice may be grasped and removed. Preferably, the toasting operation may be aborted, optionally, by an upward motion of the handle which effects separation of the heaters and elevation of the slice carrier.

Accordingly, a further object of the invention is to provide an improved and simplified mechanism for moving one heater relative to the other so that slices of baked goods inserted therebetween may be properly positioned and more effectively toasted.

The foregoing and other objects are effected by the invention as will be apparent from the following description and claims taken in connection with the accompanying drawings, forming a part of this application, in which:

Fig. 1 is a vertical, longitudinal sectional view taken through a toaster constructed and arranged in accordance with the invention, showing the interior in elevation;

Fig. 2 is a transverse sectional view taken through the toaster of Fig. 1 along lines II—II showing the carriage and slice carrier in the upper, slice receiving position;

Figure 3:
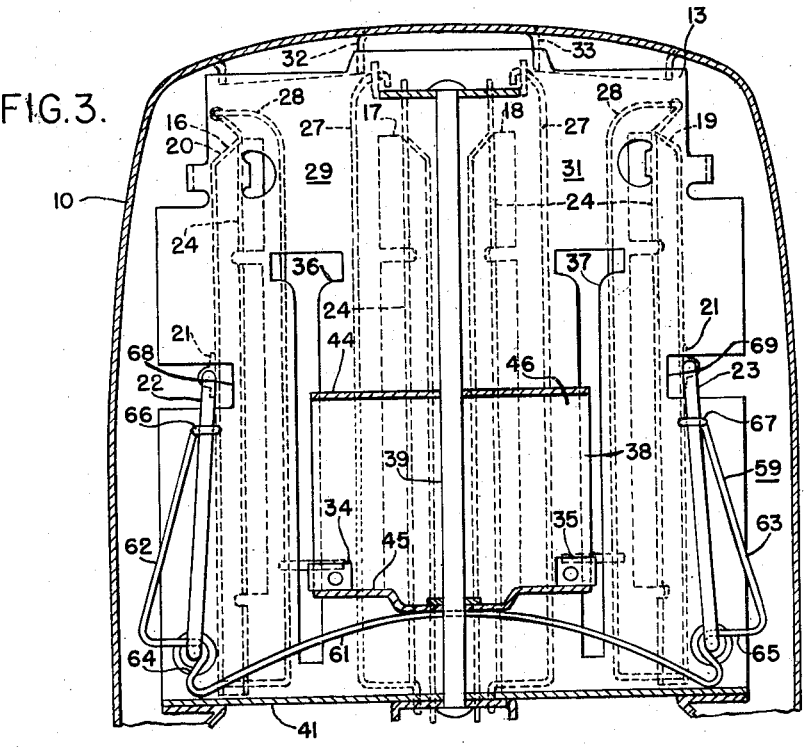
Fig. 3 is a sectional view similar to Fig. 2 but showing the carriage in the lower, toasting position.

Reference will now be had to the drawings disclosing the invention applied to a domestic toaster of the so-called "pop-up" type, which includes a shell or casing 10, suitably supported on a base 11. Arranged within the casing 10 are longitudinally spaced and vertically extending partitions 12 and 13 which define a toasting chamber, generally indicated at 14, and an apparatus compartment 15, the latter housing the operating mechanism of the toaster. A plurality of generally flat heaters or heating structures, usually four in number in a two slice toaster as shown, are indicated at 16, 17, 18 and 19, and are transversely spaced within the toasting chamber 14 for radiantly heating the material to be toasted.

The heaters 16, 17, 18, and 19 are generally similar to the toaster heaters described and claimed in Palmer et al, application Serial No. 444,112, filed July 19, 1954, and assigned to the assignee of the present invention. A reflecting support 20, formed from aluminum plate, is shown as part of the heater 16, the latter being structurally representative of all the heaters in the present embodiment.

The heaters 17 and 18 are stationary, in back-to-back relation, near the center of the toaster. The heaters 16 and 19 are attached as by clips 21 to links 22 and 23, and respectively supported thereon at the outer sides of the toasting chamber 14, for movement toward and away from the stationary heaters 17 and 18, respectively. The links 22 and 23 are supported on the partitions 12 and 13, and connected to their respective heaters 16 and 19 to permit swivel-like as well as linear movements, the advantage of which will be further discussed below. The purpose of providing relative movement between each pair of heaters 16 and 17, and 18 and 19 is to very the distance therebetween so that slices of baked goods of varying thickness may be accommodated and uniformly toasted. A toaster broadly claiming this feature is disclosed in the copending application of Ralph Sorenson Serial No. 632,357 filed January 3, 1957, and assigned to the assignee of the present application.

An electrical resistance element 24 is formed in a generally serpentine configuration and supported in insulated relationship on the reflecting support 20 by mica strips 25 and 26. The stationary heaters 17 and 18 are provided with vertically extending guard wires 27, for interposition between the surface of the material to be toasted and the resistance elements, to prevent the latter from making direct contact with the baked goods. Similar guard wires 28, serving the same purpose, are attached to the movable heaters 16 and 19 for movement therewith. The guard wires 27 and 28, as set forth, are disposed parallel to the resistance elements 24 in order that a flat surface of material to be toasted, such as a bread slice, will be parallel to the resistance elements 24 when in contact with the guard wires 27 and 28 and will therefore be uniformly toasted. This feature is likewise applicable to tapered slices of baked goods since the movable heaters 16 and 19 are capable of angular movement about a horizontal axis.

Toasting wells 29 and 31 are defined, respectively, by each pair of heaters 16 and 17, and 18 and 19 within the toasting chamber 14. Apertures 32 and 33 are formed in the upper side of the casing 10 for the passage of bread slices to and from the respective toasting wells 29 and 31. Slice carriers 34 and 35 are arranged for vertical movement within the toasting wells 29 and 31, respectively. Each of the carriers 34 and 35 has an end thereof extending into the apparatus compartment 15 through vertical slots 36 and 37 formed in the partition 13 which separates the apparatus compartment 15 from the toasting chamber 14. A carriage 38 which is movable upwardly and downwardly in the compartment 15 upon a vertical slide rod 39 supports these carriers and is secured thereto in a manner to be discussed hereinafter.

The slide rod 39 is secured adjacent its lower end in any suitable manner to a lower horizontal flange 41 which forms a part of the partition 13. The upper end of the slide rod 39 is positioned within an upper horizontal flange 42 which is secured to the partition 13. As shown, the carriage 38 has upper and lower horizontally extending portions 44 and 45, respectively, provided with openings, through which the vertical rod 39 projects, and inner and outer vertical portions 46 and 47, respectively, connected to the horizontal portions 44 and 45 and forming the frame of the carriage 38. The ends of the carriers 34 and 35 are secured, as by rivets, to the inner vertical portion 46 of the carriage 38 for vertical movement therewith. A spring 48 for biasing the carriage upwardly is connected between the lower horizontal portion 45 of the carriage 38 and the fixed upper horizontal flange 42, which spring passes through a second opening in the upper horizontal portion 44 of the carriage. An arm 49 is rigidly fixed in any suitable manner to the carriage 38 and extends outwardly and horizontally therefrom. A latching lever 51 is attached by a pivot pin 50 to the arm 49 for angular movement about the pin 50 and movement bodily with the carriage 38. One end portion of the lever 51 extends through a vertical slot in the casing 10 and is provided with a handle 52 for the manual lowering of the carriage 38. The other end portion of the lever 51 is provided with a catch 53 which is arranged to latch with a magnetically attractable, movable detent 55 when the carriage 38 is in a lower or toasting position. The detent 55 is biased by a spring 56 into a non-contacting or open position with respect to a solenoid 57 so that, upon manual movement of the carriage 38 to a lower position, the bread carriers 34 and 35 and the bread slices supported thereon are disposed in toasting position and are retained in that position during the toasting operation by the aforementioned latching action.

Energization of the solenoid 57 can be accomplished by any suitable condition responsive control. Preferably, a thermostatic switch which responds to the temperature of the bread surface is employed, and may be of the type disclosed by the applicant in his copending application, Serial No. 596,221, dated July 6, 1956. A description of this control is omitted for the sake of brevity and clearness and since it forms no part of the present invention. A knob 58 is provided so that the user may adjust the control to select the desired shade of toast. The resultant magnetic attraction of the detent 55 toward the solenoid 57, at the conclusion of the toasting operation, disengages the catch 53 and detent 55 for the release of the carriage 38 and movement of the carriers 34 and 35 to an upper non-toasting position. The toasting operation may be aborted manually by an upward flick of the handle 52 which causes unlatching of the catch 53 and detent 55.

Figure 4:
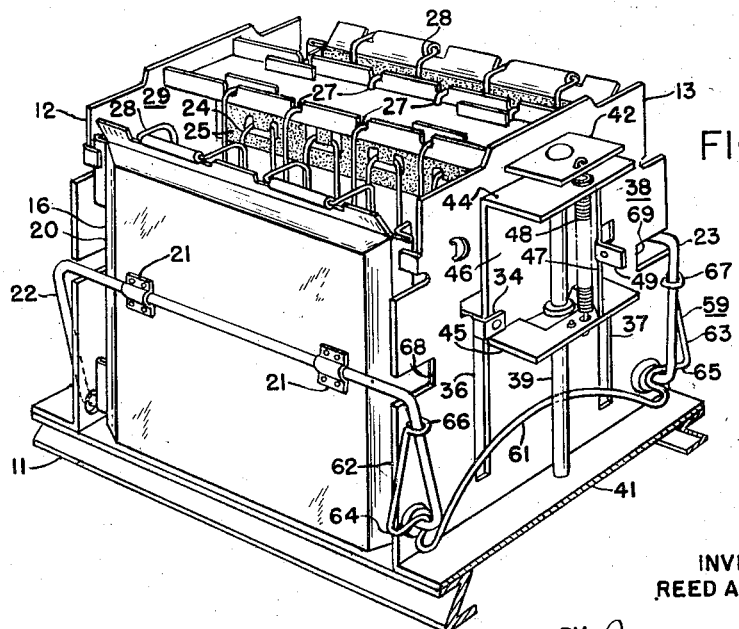
Fig. 4 is a perspective view of the toaster, with the casing shell removed, showing portions of the toaster mechanism in the position illustrated in Fig. 2.

In accordance with this invention, a resilient lever or spring actuator 59, as best seen in Fig. 4, is provided for biasing the movable heaters and disposed in a vertical plane within the apparatus compartment 15. Made from slender elastic material, this lever 59 has a body or intermediate portion 61, which is bowed or arched upwardly and lies in the lower portion of the path of movement of the carriage 38. The lever 59 also has two legs or terminal portions 62 and 63, and respective connecting portions 64 and 65, which integrally connect the legs 62 and 63 to the body 61. The connecting portions 64 and 65 are U-shaped and define saddles engaging the links 22 and 23, respectively. The body portion 61 of the lever 59 biases the connecting portions 64 and 65 into engagement with the lower portion of the respective links 22 and 23 so that pivotal support is thereby given to the lever 59. Stated another way, the lever 59 is provided with pivotal support at one connecting portion, for example, the portion 64, and means for limiting angular movement of the lever 59 at the other connecting portion 65. Each of the two legs 62 and 63 extends along a vertical portion of its associated link 22 and 23. The legs 62 and 63 are provided with respective eyelets 66 and 67 at the ends thereof connecting a leg and its associated link. The bias of the resilient lever 59 is imparted to the links 22 and 23 through the eyelets 66 and 67 for moving the heaters 16 and 19.

When the carriage 38 is in an upper position, the slice carriers 34 and 35 are then in a slice receiving position and the bias of the lever 59 effects maximum spacing of the heater pairs 16 and 17, and 18 and 19. Downward movement of the carriage 38 causes engagement of the lower horizontal portion 45 of the carriage 38 with intermediate portions of the lever body 61, and downward deflection of the latter is effected. Consequently, the lever legs 62 and 63 move inwardly as they pivot about their respective, pivotally supported, connecting portions 64 and 65, and the movable heaters 16 and 19 are moved toward their associated fixed heaters 17 and 18. The extent of movement of each movable heater is limited by contact of its respective guard wires 27 and 28 with a bread slice, or by contact of its links 22 and 23, respectively, with stops 68 and 69, formed in the partitions 12 and 13. The resilience of the lever 59 permits the movable heaters 16 and 19 to be positioned independently from a common actuating system, so that one thick slice and one thin slice can be simultaneously positioned for uniform toasting.

From the foregoing description it will be apparent that an improved toaster has been provided wherein maximum spacing of the heaters defining a toasting well is effected for accommodating unusually thick bread slices. The resilient lever structure, which biases the movable heaters into maximum spacing, also responds to the lowering of the carriage to a toasting position by reversing the direction of bias. This reversal causes each movable heater to move toward its associated heater, thereby gripping and positioning the bread slice disposed therebetween for uniform toasting. A tapered bread slice may also be toasted uniformly, if properly placed on the slice carrier, since each movable heater is capable of assuming any one of an infinite number of oblique positions during the toasting operation. Although a two slice or double well toaster is described and illustrated, it is to be understood that this invention can be practiced by applying the foregoing teachings to single slice or multi-slice toasters.

While the invention has been shown in but one form, it will be obvious to those skilled in the art that it is not so limited, but is susceptible of various changes and modifications without departing from the spirit thereof.

What is claimed is:

1. In a toaster, the combination of spaced heaters defining a toasting well therebetween, means for admitting bread slices of various thicknesses to the well, a bread carriage for the slice movable in said well between a non-toasting and a toasting position, means supporting one of the heaters for movement toward and away from the other heater, a spring actuator for the movable heater and spaced supports for the actuator, said actuator having a first portion spanning said supports in the path of movement of the carriage and an extension connecting said movable heater and said first portion of the actuator, the bias of said actuator effecting maximum spacing of the heaters in the non-toasting position of the carriage, said first portion of the actuator being deflected by the carriage as the latter approaches its toasting position for moving said one heater toward the other heater, the construction and arrangement being such that the bread slice is engaged by the heaters and properly positioned relative thereto in the toasting position of the carriage.

2. A toaster, including a pair of spaced, relatively movable, electrical heaters, a frame, means linking one of said heaters to the frame, the other of said heaters being fixed to the frame, a slice carrier for transporting bread slices to and from a toasting position, means for adjusting said carrier linearly between the heaters, a resilient lever structure comprising a body portion, a terminal portion connected to the linking means and a connecting portion for flexibly connecting said body and terminal portions, means pivotally supporting the lever structure adjacent said connecting portion, means limiting the angular movement of said body portion about said pivotal supporting means, said one heater being biased away from the other heater by said lever structure, said adjusting means having a portion thereof engageable with the portion of said lever structure disposed between said limiting means and said pivotal supporting means during movement of said slice carrier to the toasting position so that said one heater is then biased toward the other heater, the construction and arrangement being such that the bread slice is gripped between the heaters and the extent of movement of said one heater is determined by the thickness of the bread slice.

3. A toaster including a casing structure having a toasting chamber therein, at least two spaced electrical heaters disposed within the toasting chamber, means for supporting the heaters for relative movement toward and away from each other, a carriage having a slice carrier extending within the toasting well, means supporting the carriage and providing for upward and downward movement thereof between an upper, slice receiving position and a lower, toasting position, a resilient lever structure and spaced supports for the lever structure, said lever structure having a first portion spanning said supports in the path of movement of the carriage and terminal portions respectively connecting said heaters and said first portion of the lever structure, the bias of said lever structure effecting maximum spacing of the heaters in the non-toasting position of the carriage, said first portion of the actuator being deflected by the carriage as the latter approaches its toasting position for moving said heaters toward each other, the construction and arrangement being such that the bread slice is engaged by the heaters and properly positioned relative thereto in the toasting position of the carriage.

4. In a toaster, the combination of two pairs of spaced heaters, each pair including a fixed heater and a movable heater arranged to form a totasting well therebetween, means for supporting each movable heater for movement toward and away from its associated fixed heater, a carriage having slice carriers disposed within the toasting wells, means supporting the carriage and providing for upward and downward movement thereof between an upper, slice receiving position and a lower, toasting position, a resilient unitary lever, said lever having two terminal portions attached to said respective movable heater supporting means and an arched intermediate portion engageable with the carriage as the latter approaches its toasting position, and means for pivotally supporting the lever adjacent the junctions of said intermediate portion and said terminal portions so that, upon engagement of the carriage with said intermediate portion, the latter is distended along its overall length, the construction and arrangement being such that the terminal portions then move angularly about the lever supporting means and bias the movable heaters toward their associated fixed heaters causing a bread slice to be gripped between each pair of heaters and properly positioned relative thereto in toasting position, each movable heater being biased away from said fixed heater to effect maximum spacing therebetween during disengagement of said carriage from the lever.

5. In a toaster, the combination of two pairs of spaced heaters, each pair including a fixed heater and a movable heater arranged to form a toasting well therebetween, means for supporting each movable heater for movement toward and away from its associated fixed heater, the latter means also providing the angular movement of each movable heater about a horizontal axis, a carriage having slice carriers disposed within the toasting wells, means supporting the carriage and providing for upward and downward movement thereof between an upper, slice receiving position and a lower, toasting position, a resilient unitary lever, said lever having two terminal portions attached to said respective movable heater supporting means and an arched intermediate portion engageable with the carriage as the latter approaches its toasting position and means for pivotally supporting the lever adjacent the junctions of said intermediate portion and said terminal portions so that, upon engagement of the carriage with said intermediate portion, the latter is distended along its overall length, the construction and arrangement being such that the terminal portions then move angularly about the lever supporting means and bias the movable heaters toward their associated fixed heaters causing a bread slice to be gripped between each pair of heaters and properly positioned relative thereto in toasting position, each movable heater being biased away from said fixed heater to effect maximum spacing therebetween during disengagement of said carriage from the lever.

6. In a toaster, the combination of two pairs of spaced heaters, each pair including a fixed heater and a movable heater arranged to form a toasting well therebetween, means for supporting each movable heater for movement toward and away from its associated fixed heater, a carriage having slice carriers disposed within the toasting wells, means supporting the carriage and providing for upward and downward movement thereof between an upper, slice receiving position and a lower, toasting position, a resilient unitary lever, said lever comprising an arched intermediate portion engageable with the carriage as the latter approaches its toasting position, and two terminal portions, each of said terminal portions having a first end connected to its associated movable heater supporting means and a saddle portion formed at the other end thereof integrally connected to said intermediate portion, spaced pivotal supports for the lever, said saddle portions respectively engaging said supports for pivotal support of said lever, the bias of said lever effecting maximum spacing of the heaters in the upper position of the carriage, said intermediate portion of the lever being deflected by the carriage as the latter approaches its toasting position, the construction and arrangement being such that the terminal portions then move angularly about the pivotal supports and bias the movable heaters toward their associated fixed heaters whereby bread slices of unequal thickness may be engaged by their associated heaters and properly positioned relative thereto in the toasting position of the carriage.

References Cited in the file of this patent

UNITED STATES PATENTS

| | | |
|---|---|---|
| 1,687,712 | Chandler | Oct. 16, 1928 |
| 2,525,111 | Astphan | Oct. 10, 1950 |
| 2,788,734 | Weeks | Apr. 16, 1957 |